(12) United States Patent
Youn et al.

(10) Patent No.: US 10,149,170 B2
(45) Date of Patent: Dec. 4, 2018

(54) METHOD AND APPARATUS FOR CONTROLLING ADAPTIVE FLOW IN WIRELESS COMMUNICATION SYSTEM

(71) Applicant: Samsung Electronics Co., Ltd., Suwon-si, Gyeonggi-do (KR)

(72) Inventors: Il-Jin Youn, Bucheon-si (KR); Il-Won Kwon, Seoul (KR); Hee-Kwang Lee, Suwon-si (KR); Jung-Ah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/328,831

(22) PCT Filed: Jul. 24, 2015

(86) PCT No.: PCT/KR2015/007713
§ 371 (c)(1),
(2) Date: Jan. 24, 2017

(87) PCT Pub. No.: WO2016/013899
PCT Pub. Date: Jan. 28, 2016

(65) Prior Publication Data
US 2017/0215076 A1  Jul. 27, 2017

(30) Foreign Application Priority Data
Jul. 25, 2014 (KR) .................. 10-2014-0094808

(51) Int. Cl.
*H04W 72/00* (2009.01)
*H04W 16/04* (2009.01)
(Continued)

(52) U.S. Cl.
CPC .......... *H04W 16/04* (2013.01); *H04B 17/318* (2015.01); *H04L 5/0048* (2013.01);
(Continued)

(58) Field of Classification Search
CPC ............ H04W 72/04; H04W 72/0486; H04W 72/082; H04W 76/02; H04W 16/06;
(Continued)

(56) References Cited

U.S. PATENT DOCUMENTS 4,670,899 A * 6/1987 Brody .................. H04W 16/06
455/436
2011/0065436 A1* 3/2011 Svedevall ............ H04W 36/22
455/436
(Continued)

FOREIGN PATENT DOCUMENTS

EP 2 849 357 A1 3/2015
KR 10-2014-0033655 A 3/2014
(Continued)

OTHER PUBLICATIONS

Blackberry UK Limited, "Necessity of flow control for various U-plane alternatives", R2-134116, 3GPP TSG RAN WG2 Meeting #84; San Francisco, USA; Nov. 1, 2013.
(Continued)

*Primary Examiner* — Temica M Beamer
(74) *Attorney, Agent, or Firm* — Jefferson IP Law, LLP

(57) ABSTRACT

A method and an apparatus for controlling an adaptive flow in a wireless communication system is provided. A method of a master base station in a wireless communication system, in which base stations having different cell sizes coexist, comprises the steps of: receiving load information from at least one other base station, receiving channel information about the at least one other base station from a terminal connected to the master base station, determining a secondary base station capable of load sharing for the terminal on basis of the channel information and the load information, and requesting, from the terminal, a further connection to the secondary base station. Offloading for downlink transmission of the terminal is determined based on the load infor-
(Continued)

mation of a small cell. Furthermore, a resource distribution ratio for downlink transmission of the terminal is determined based on channel quality information reported from the terminal.

20 Claims, 11 Drawing Sheets

(51) Int. Cl.
| | | |
|---|---|---|
| *H04W 16/08* | (2009.01) | |
| *H04W 24/00* | (2009.01) | |
| *H04W 88/08* | (2009.01) | |
| *H04B 17/318* | (2015.01) | |
| *H04L 5/00* | (2006.01) | |
| *H04W 28/14* | (2009.01) | |
| *H04W 16/32* | (2009.01) | |

(52) U.S. Cl.
CPC ........... *H04W 16/08* (2013.01); *H04W 24/00* (2013.01); *H04W 28/14* (2013.01); *H04W 88/08* (2013.01); *H04W 16/32* (2013.01)

(58) Field of Classification Search
CPC ..... H04W 16/08; H04W 16/10; H04W 16/14; H04W 28/16; H04W 28/08; H04W 28/085; H04W 24/02; H04W 74/02; H04W 36/22; H04W 36/30; H04W 36/18; H04W 36/14; H04W 36/08; H04W 36/12
USPC ...................... 455/452.1, 453, 450, 436, 442
See application file for complete search history.

(56) References Cited

U.S. PATENT DOCUMENTS

| | | | | |
|---|---|---|---|---|
| 2011/0255514 A1* | 10/2011 | Olofsson | ........... | H04W 72/0426 370/331 |
| 2012/0127954 A1 | 5/2012 | Lim et al. | | |
| 2013/0244640 A1* | 9/2013 | Viorel | ............... | H04W 56/0005 455/422.1 |
| 2013/0258974 A1 | 10/2013 | Lee et al. | | |
| 2013/0322235 A1 | 12/2013 | Khoryaev et al. | | |
| 2014/0071943 A1 | 3/2014 | Lee et al. | | |
| 2014/0073331 A1 | 3/2014 | Lee et al. | | |
| 2014/0128084 A1 | 5/2014 | Zhong et al. | | |
| 2015/0078286 A1 | 3/2015 | Kim et al. | | |
| 2015/0365953 A1* | 12/2015 | Papadopoulos | ... | H04W 72/0406 370/329 |

FOREIGN PATENT DOCUMENTS

| | | |
|---|---|---|
| KR | 10-2014-0033657 A | 3/2014 |
| KR | 10-2014-0034298 A | 3/2014 |
| WO | 2013/112082 A1 | 8/2013 |
| WO | 2013/168917 A1 | 11/2013 |

OTHER PUBLICATIONS

3GPP TR 36.842, "3rd Generation Partnership Project; Technical Specification Group Radio Access Network; Study on Small Cell enhancements for E-UTRA and E-UTRAN; Higher layer aspects" Valbone, France; Dec. 2013.

Samsung, "SCE signalling flows, discussion of remaining issues", R2-140588, 3GPP TSG RAN2 Meeting #85; Prague, Czech Republic; Feb. 1, 2014.

Samsung, "Discussion on UL split operation based on configurable ratio", R2-141398, 3GPP TSG RAN WG2 Meeting #85bisl; Valencia, Spain; Mar. 22, 2014.

Huawei, "Support of PDCP reordering and flow control for a DL split bearer", R2-141290, 3GPP TSG RAN WG2 Meeting #85bis; Valencia, Spain; Mar. 22, 2014.

European Search Report dated Feb. 15, 2018, issued in European patent application No. 15824551.4.

* cited by examiner

METHOD AND APPARATUS FOR CONTROLLING ADAPTIVE FLOW IN WIRELESS COMMUNICATION SYSTEM

CROSS-REFERENCE TO RELATED APPLICATION(S)

This application is a U.S. National Stage application under 35 U.S.C. § 371 of an International application filed on Jul. 24, 2015 and assigned application number PCT/KR2015/007713, which claimed the benefit of a Korean patent application filed on Jul. 25, 2014 in the Korean Intellectual Property Office and assigned Serial number 10-2014-0094808, the entire disclosure of which is hereby incorporated by reference.

TECHNICAL FIELD

The present invention relates to a method and an apparatus for controlling an adaptive flow in a wireless communication system and, more particularly, to a method and an apparatus for controlling an adaptive flow for a dual connectivity.

BACKGROUND ART

Recently, discussions on an advanced long term evolution (LTE) communication system (LTE-A), in which various new technologies are grafted into the LTE communication system to increase a transmission rate, have been progressed in earnest. A representative of the newly introduced technologies for LTE-A may be carrier aggregation. The carrier aggregation uses a plurality of forward carriers and a plurality of backward carriers by one terminal unlike the conventional data transmission/reception using only one forward carrier and one backward carrier by the terminal The current LTE-A defines only intra-ENB (Evolved NodeB) carrier aggregation. However, in order to guarantee a high data transmission rate of the terminal, a necessity of a technology for aggregating different cells in an environment in which a plurality of cells having different sizes operate while overlapping each other is currently generated. Accordingly, currently, in 3GPP Rel-12, inter-ENB carrier aggregation or a technology of dual connectivity between different types of ENBs that combines and uses serving cells belonging to different ENBs is being discussed. For example, in 3GPP Rel-12, performance of dual connectivity by which each terminal is simultaneously connected to two different ENBs is being discussed. However, a detailed method of transmitting and receiving data of the terminal in a dual connectivity state has not been yet proposed, so that it is required to provide a detailed method of data transmission and reception of the terminal.

DETAILED DESCRIPTION OF THE INVENTION

Technical Problem

Accordingly, an embodiment of the present invention provides a method and an apparatus for adaptively controlling a flow for dual connectivity of a terminal in a wireless system in which a plurality of cells having different sizes operate while overlapping each other.

Another embodiment of the present invention provides a method and an apparatus for determining, by a BS of a macro cell, offloading for downlink transmission of the terminal based on load information of a small cell in a state where the terminal is dually connected to the macro cell and the small cell.

Still another embodiment of the present invention provides a method and an apparatus for determining, by the BS of the macro cell, a resource distribution ratio between the macro cell and the small cell for downlink transmission of the terminal based on channel quality information reported from the terminal in the state where the terminal is dually connected to the macro cell and the small cell.

Technical solution

According to an embodiment of the present invention, a method of a master base station (BS) in a wireless communication system in which BSs having different size cells coexist may include: receiving load information from at least one other BS; receiving channel information of the at least one other BS from a terminal accessing the master BS; determining a secondary BS, which can share a load of the terminal, based on the channel information and the load information; and making a request for additional access to the secondary BS to the terminal.

According to an embodiment of the present invention, an apparatus of a master BS in a wireless communication system in which BSs having differently sized cells coexist may include: a communication unit configured to receive load information from at least one other base station (BS) and receive channel information of the at least one other BS from a terminal accessing the master BS; and a controller configured to determine a secondary BS, which can share a load of the terminal, based on the channel information. The communication unit is further configured to transmit a request for additional access to the secondary BS to the terminal.

Effects of the Invention

In a wireless communication system supporting dual connectivity for different BSs, a BS of a macro cell may determine offloading for downlink transmission of a terminal based on load information of a small cell and determine a resource distribution ratio between the macro cell and the small cell for downlink transmission of the terminal based on channel quality information reported from the terminal, thereby acquiring effects of increasing a transmission rate of the terminal according to a load of the small cell and a channel state of the terminal and improving a cell transmission rate of the overall system.

MODE FOR CARRYING OUT THE INVENTION

Figure 1:
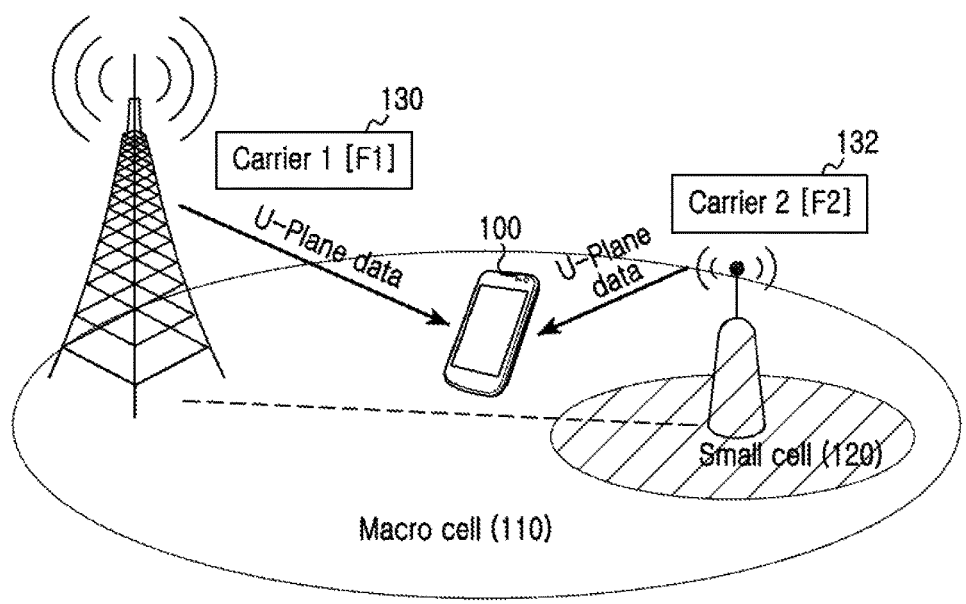
FIG. 1 illustrates a dual connectivity structure to which an embodiment of the present invention is applied.

Hereinafter, some embodiments of the present invention will be described with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. If a component is described as "connected", "coupled", or "linked" to another component, one of ordinary skill in the art would understand the components are not necessarily directly "connected", "coupled", or "linked" but also are indirectly "connected", "coupled", or "linked" via a third component.

A wireless communication system according to an embodiment of the present invention includes a plurality of base stations (BSs). The BS generally refers to a fixed station that communicates with a terminal, and may be called another term, such as an evolved-NodeB (eNB), a base transceiver system (BTS), or an access point (AP). Each BS provides a communication service to a specific geographical region (in general, referred to as a cell). The cell may be divided into a plurality areas (or sectors). The cell should be construed as an inclusive meaning indicating some areas covered by the BS and includes all various coverage areas such as a mega cell, macro cell, micro cell, pico cell, and femto cell. Hereinafter, a wireless communication system in which a macro cell and a small cell overlap each other will be described as an example of the present invention. In the following description, the macro cell and the small cell refer to cells in different sizes. Further, the macro cell refers to a cell in the size that may include at least one small cell within a coverage area, and the small cell may include cells in the size that are included in a coverage area of the macro cell such as a micro cell, a pico cell, and a femto cell. In the following embodiment, each of the macro BS (or macro eNB or MeNB) and the small BS (or small eNB or SeNB) provides a communication service to a plurality of cells. For example, the macro BS may provide a communication service to a plurality of macro cells, and the small BS may provide a communication service to a plurality of small cells. A plurality of cells supported by one BS may geographically overlap each other, and the geographically overlapping cells may support different frequencies.

The user equipment (UE) may be fixed or mobile, and may be called another term, such as a terminal, a mobile station (MS), a mobile terminal (MT), a user terminal (UT), a subscriber station (SS), a wireless device, a personal digital assistance (PDA), a wireless modem, or a handheld device.

Hereinafter, according to various embodiments of the present invention, in a wireless communication system in which a plurality of cells having different sizes operate while overlapping each other, a technology for adaptively controlling a flow for a downlink through bearer division in dual connectivity of the terminal will be described. Hereinafter, embodiments of the present invention are described based on LTE system terms defined in 3GPP, but the embodiments of the present invention are not limited to the LTE system and can be equally applied to all wireless communication systems in which dual connectivity of the terminal is possible in a state where a plurality of cells having different sizes overlap each other.

FIG. 1 illustrates a dual connectivity structure to which an embodiment of the present invention is applied.

Referring to FIG. 1, a macro BS for a macro cell 110 provides a communication service through a carrier 130 having a central frequency f1, and a small BS for a small cell 120 provides a communication service through a carrier 132 having a central frequency f2. The terminal according to an embodiment of the present invention may aggregate and use the carrier 130 having the downlink central frequency f1 and the carrier 132 having the downlink central frequency f2. That is, the terminal according to an embodiment of the present invention may support carrier aggregation between BSs that use carriers for different BSs.

The carrier aggregation means configuring a plurality of serving cells. For example, in general, a downlink carrier transmitted by one BS and an uplink carrier received by the corresponding BS may constitute one cell. That is, data reception of the terminal through a predetermined downlink carrier and data transmission of the terminal through a predetermined uplink carrier refer to data transmission and reception using central frequencies that specify the downlink carrier and the uplink carrier and a control channel and a data channel that are provided by a cell corresponding to the frequency band. Accordingly, carrier aggregation may mean that the terminal simultaneously transmits and receives data through a plurality of cells and that the terminal configures a plurality of serving cells. A plurality of serving cells for the terminal may be divided into a primary cell (PCell) (hereinafter, referred to as a "primary serving cell") and a secondary cell (SCell) (hereinafter, referred to as a "secondary serving cell") according to roles thereof The primary serving cell refers to a serving cell that takes charge of access of the terminal to a network and mobility of the terminal, and the secondary serving cell refers to a serving cell additionally configured to increase a transmission/reception rate of uplink and downlink data of the terminal, which may be mainly used for transmitting user data. Further, the plurality of serving cells for the terminal may be divided into a primary cell group (PCG) and a secondary cell group (SCG). The primary cell group (PCG) may be referred to as a master cell group (MCG). The primary cell group may correspond to a set of serving cells controlled by a master eNB (MeNB) that controls the primary serving cell (PCell), and the second cell group may correspond to a set of serving cells controlled by a secondary eNB (SeNB), not the BS that controls the primary serving cell (PCell). The master eNB may be called another term such as a master BS. The secondary eNB may be called another term such as a secondary BS. The BS may provide information indicating whether the corresponding cell belongs to the PCG (or MCG) or the SCG in a process of configuring the serving cell. The main objective in using the above described terms in the specification is to distinguish a cell controlled by the master eNB that controls the primary serving cell (PCell) of the terminal.

Hereinafter, for convenience of the description, the inter-eNB carrier aggregation may be referred to as dual connectivity. Further, hereinafter, for convenience of the description, it is assumed that the terminal aggregates a carrier for one primary serving cell and a carrier for one secondary serving cell. However, embodiments of the present invention are not limited thereto, and the same method can be applied to a case where the terminal aggregates a carrier for one primary serving cell and carriers for a plurality of secondary serving cells. Further, in the following embodiments, it is assumed that the master eNB (MeNB) controlling the primary serving cell is the macro BS, and the secondary eNB (SeNB) controlling the secondary serving cell is the small BS. Accordingly, in the specification, the MeNB may refer to the master eNB and/or the macro BS, and the SeNB may refer to the secondary eNB and/or the small BS.

Figure 2A:
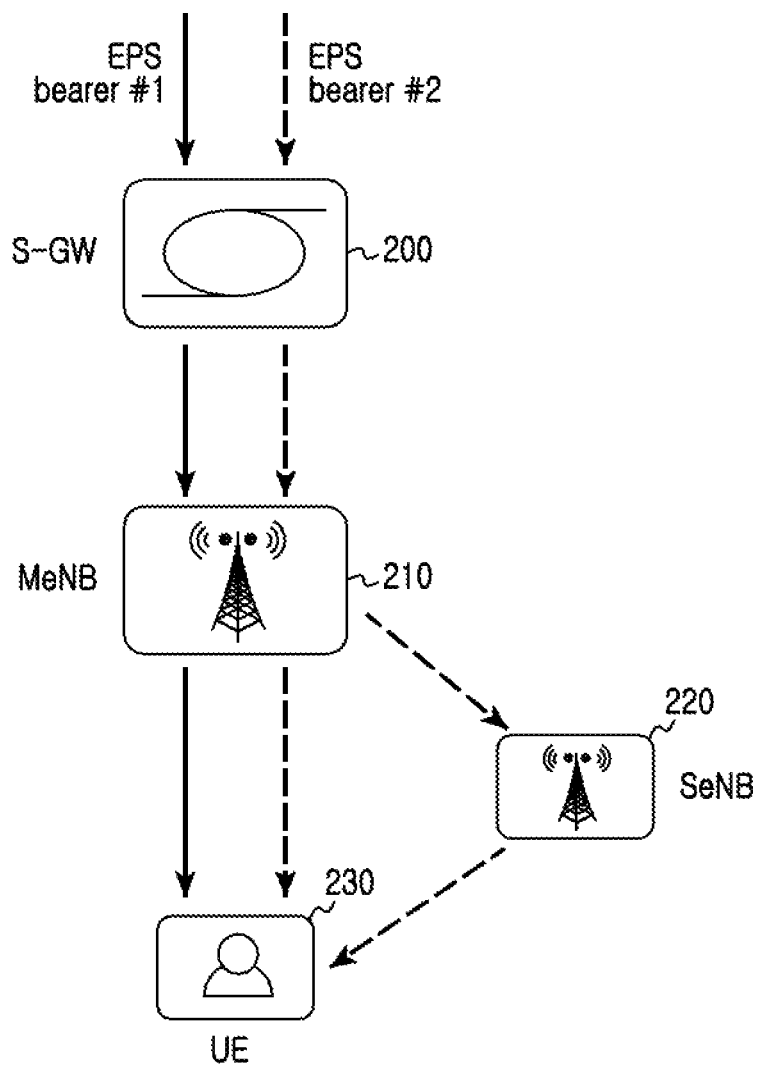
FIG. 2A illustrates a bearer division structure for a terminal that is dually connected to a macro cell and a small cell according to an embodiment of the present invention.
Figure 2B:
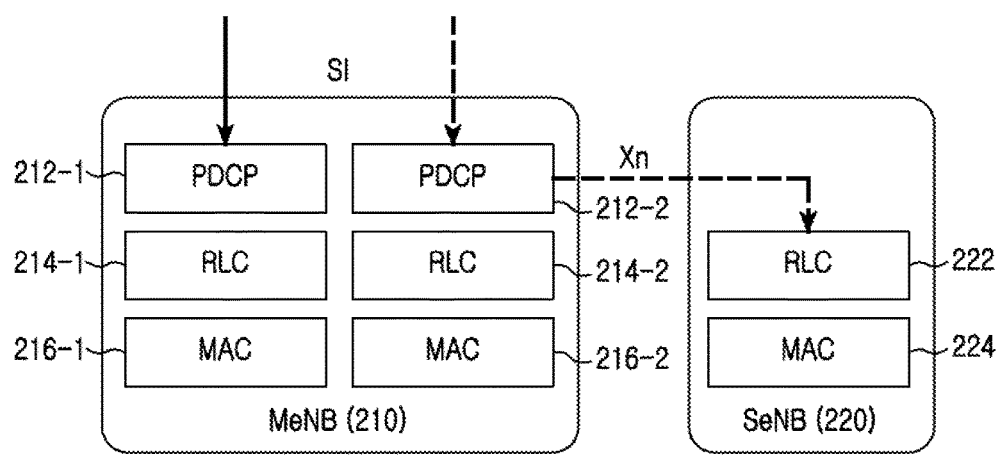
FIG. 2B illustrates a protocol stack structure for bearer division of the macro BS and the small BS according to an embodiment of the present invention.

FIG. 2A illustrates a bearer division structure for the terminal that is dually connected to the macro cell and the small cell according to an embodiment of the present invention, and FIG. 2B illustrates a protocol stack structure for bearer division of the macro BS and the small BS according to an embodiment of the present invention.

Referring to FIG. 2A, a terminal 230 may be dually connected to an MeNB 210 and an SeNB 220 according to an embodiment of the present invention. Here, the MeNB 210 may take charge of access of the terminal 230 to the network through the primary cell and a control function related to mobility, and may transmit and receive uplink and downlink data of the terminal 230. The SeNB 220 transmits and receives uplink and downlink data of the terminal 230 through the secondary serving cell.

When the terminal 230 accesses the network, two types of bearers may be generated between a P-GW (not shown) and the terminal. That is, a first EPS bearer (evolved packet system bearer #1) and a second EPS bearer (EPS bearer #2) may be generated between the P-GW (not shown) and the terminal. At this time, the first EPS bearer may be generated between the S-GW 200, the MeNB 210, and the terminal 230. Further, the second EPS bearer may be generated between the S-GW 200, the MeNB 210, the SeNB 220, and the terminal 230. That is, the second EPS bearer may be divided into a bearer that connects the MeNB 210 and the terminal 230 through dual connectivity of the terminal and a bearer that connects the MeNB 210 and the terminal 230 through the SeNB 220 according to an embodiment of the present invention. For example, the second EPS bearer is divided at the MeNB 210 of the terminal 230. To this end, the MeNB 210 according to an embodiment of the present invention may transfer some PDCP PDUs (packet data units) to RLC layers 214-1 and 214-2 and route some PDCP PDUs to the SeNB 220 in PDCP (packet data convergence protocol) layers 212-1 and 212-2 as illustrated in FIG. 2B.

As illustrated in FIG. 2B, the MeNB 210 may include a PDCP layer 212-1, an radio link control (RLC) layer 214-1, and an MAC layer (medium access control) layer 216-1 corresponding to the first EPS bearer, and a PDCP layer 212-2, an RLC layer 214-2, and an MAC layer 216-2 corresponding to the second bearer. The PDCP layers 212-1 and 212-2 perform a header compression and security function and perform a packet reordering and retransmission processing function to efficiently transmit IP packets through a radio link. Particularly, according to an embodiment of the present invention, when the terminal 230 is in a dual connectivity state, the PDCP layer 212-2 corresponding to the second bearer may transfer some packets of the downlink packets to be transmitted to the terminal 230 to the RLC layer 214-2 of the MeNB 210 and some packets to the RLC layer 222 of the SeNB 220. According to another embodiment of the present invention, when the terminal is in a dual connectivity state, the PDCP layer 212-2 corresponding to the second bearer may transfer all downlink packets to be transmitted to the terminal 230 to the RLC layer 214-2 of the MeNB 210 and all downlink packets to be transmitted to the terminal 230 to the RLC layer 222 of the SeNB 220. That is, in order to improve transmission efficiency of the terminal 230, the PDCP layer 212-2 corresponding to the second bearer may determine an amount of data, which the MeNB 210 directly transmits to the terminal 230, and an amount of data, which the MeNB 210 transmits through the SeNB 220, and partition the data according to the determined amounts of the data to transmit the partitioned data to the terminal 230 and/or the SeNB 220. In other words, the PDCP layer 212-2 corresponding to the second bearer may determine a resource distribution ratio between bearer resources between the MeNB 210 and the terminal 230 and bearer resources between the SeNB 220 and the terminal 230, and determine an amount of data, which the MeNB 210 directly transmits to the terminal 230, and an amount of data, which the MeNB 210 transmits through the SeNB 220 based on the determined resource distribution ratio. The PDCP layer 212-2 corresponding to the second bearer may determine a resource distribution ratio based on load information of the SeNB 220 which the terminal 230 accesses, channel information between the terminal 230 and the MeNB 210, and channel information between the terminal 230 and the SeNB 220.

Further, the RLC layers 214-1 and 214-2 divide packets received from the corresponding PDCP layers 212-1 and 212-2 to transmit them through the radio link. The MAC layers 216-1 and 216-2 dynamically allocate radio resources to the terminal 230 and perform a QoS control function to guarantee QoS negotiated according to each radio bearer.

The SeNB 220 may include an RLC layer 222 and an MAC layer 224 corresponding to the second bearer. The RLC layer 222 divides the packets received from the PDCP layer 212-2 of the MeNB 210 to transmit the packets to the terminal 230 through the radio link, and the MAC layer 224 dynamically allocates radio resources to the terminal 230 and performs a QoS control function to guarantee QoS negotiated according to each radio bearer.

FIG. 2B briefly illustrates a protocol stack of a user plane according to an embodiment of the present invention, and it is apparent that the MeNB 210 and the SeNB 220 may additionally include elements required for the general operation of the BS.

Figure 3:
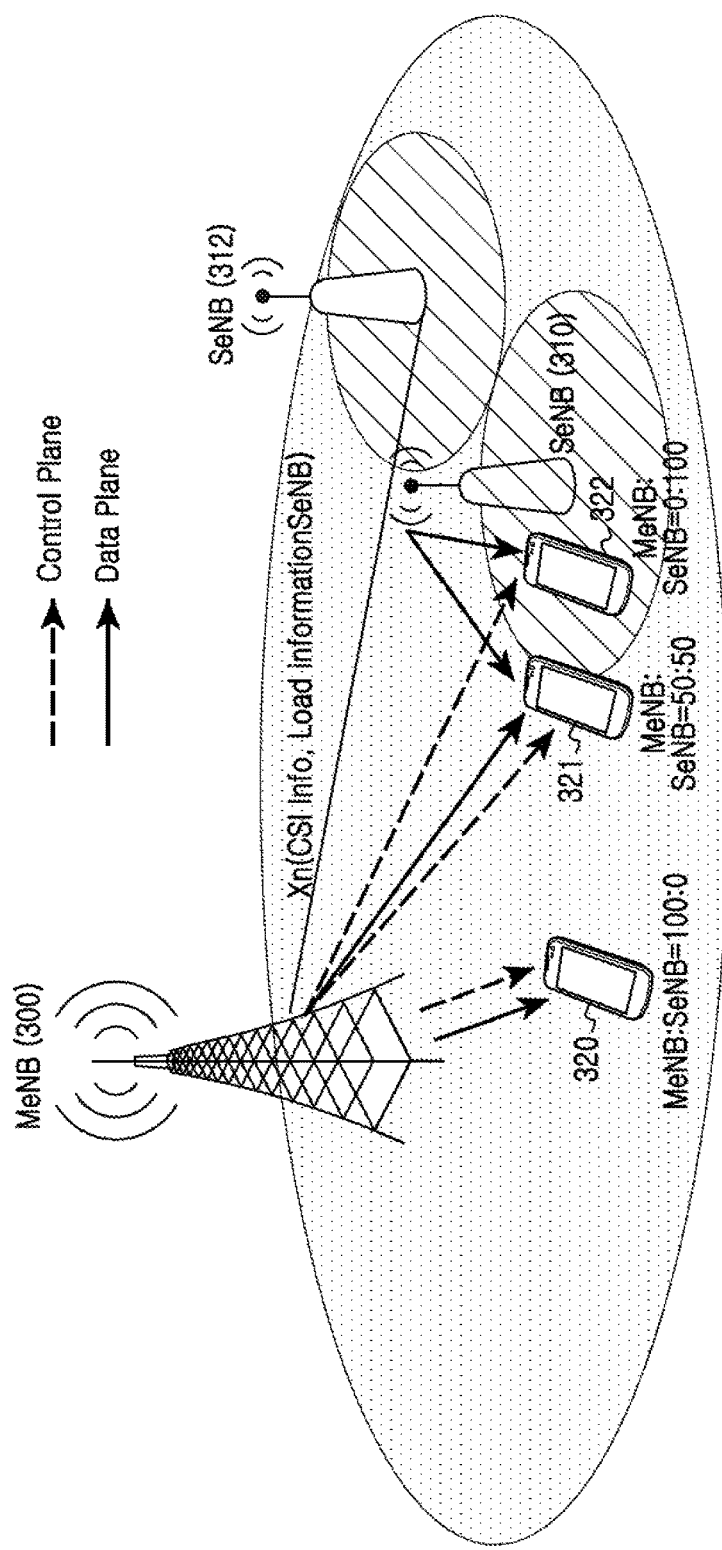
FIG. 3 illustrates a structure of adaptively controlling a flow for a downlink of the terminal in a state where the terminal is dually connected to the macro cell and the small cell according to an embodiment of the present invention.

FIG. 3 illustrates a structure of adaptively controlling a flow for terminal downlink in a state where the terminal is in a dual connectivity state with the macro cell and the small cell. Here, terminals 320, 321, and 322 according to an embodiment of the present invention correspond to terminals that support dual connectivity, and each terminal may access only the macro cell or simultaneously access the macro cell and the small cell based on a geographical location thereof and/or a strength of a signal received from each of the macro cell and the small cell.

Referring to FIG. 3, the first terminal 320 belongs to the macro cell but is located outside the small cell, so that the first terminal 320 may access only to a BS of the macro cell. Further, the second terminal 321 belongs to the macro cell and is located at a boundary of the small cell, so that the second terminal 321 may be dually connected to the macro cell and the small cell. In addition, the third terminal 322 belongs to both the macro cell and the small cell, so that the third terminal 322 may be dually connected to the macro cell and the small cell.

An MeNB 300 which is the BS of the macro cell transmits and receives a control channel and a data channel to and from the first terminal 320, the second terminal 321, and the third terminal 322. Further, the MeNB 300 may receive load information and channel quality information from SeNBs 310 and 312 through an x2 interface. Here, the load information may include load information of each of at least one cell corresponding to at least one carrier supported by each SeNB. Further, the load information may include physical resource block (PRB) use rate information of the SeNB, buffer state information of the SeNB, and the number of terminals connected to the SeNB.

The channel quality information may include channel information between at least one cell corresponding to at least one carrier supported by the NeNB 300 and at least one cell corresponding to at least one carrier supported by each SeNB. Further, the MeNB 300 may receive channel information from the terminals 320, 321, and 322 that access through the macro cell.

The MeNB 300 may control dual connectivity of the accessed terminals based on the information received from the SeNBs 310 and 312 and the information received from the terminals 320, 321, and 322. For example, the MeNB 300 may determine whether the SeNBs 310 and 312 can share the load of a particular terminal based on channel information between the terminal and the SeNBs 310 and 312 and load information of each of the SeNB 310 and 312 reported from the accessed terminal and, when it is determined that the particular SeNB 310 can share the load of the particular terminals 321 and 322, control the corresponding terminals 321 and 322 to additionally access the particular SeNB 310. According to some embodiments, when a received signal strength for the small cell of the particular SeNB reported by the particular terminal is higher than a preset threshold value and the load of the small cell of the particular SeNB is large, the MeNB 300 may control the particular terminal to not additionally access the particular SeNB. According to another embodiment, when the received signal strength for the small cell of the particular SeNB reported by the particular terminal is higher than the preset threshold value and the load of the small cell of the particular SeNB is large, the MeNB may control the particular terminal to additionally access only to the particular SeNB and may not share the load of the particular terminal with the corresponding SeNB.

Further, the MeNB 300 may determine a resource distribution ratio of the accessed terminals based on information received from the SeNB 312 to which at least one terminal perform dual connectivity, information received from the terminals 320, 321, and 322, and an amount of data to be transmitted to each terminal. Here, when the MeNB 300 desires to transmit data to a particular terminal, the resource distribution rate may refer to a bearer resource use ratio between bearer resources between the MeNB 300 and the terminal and bearer resources between the SeNB 310 and the terminal. For example, when it is assumed that the amount of data to be transmitted to the particular terminal 321 is 100, the MeNB 300 may determine an amount of data which the MeNB directly transmits to the terminal as A and an amount of data which the MeNB transmits through the SeNB 310 as (100-A), and, at this time, the resource distribution ratio may be "MeNB:SeNB=A:100-A".

According to an embodiment of the present invention, since the first terminal 320 accesses only the MeNB 300 through the macro cell, the MeNB 300 determines that the load of the first terminal 310 cannot be shared with the SeNBs 310 and 312 and determine the resource distribution ratio as "MeNB:SeNB=100:0". According to another embodiment, since the second terminal 321 accesses the MeNB 300 through the macro cell and the SeNB 310 through the small cell, the MeNB 300 may determine that the load of the second terminal 321 can be shared and determine the resources distribution ratio as "MeNB:SeNB=50:50" based on a received signal strength for the SeNB 310 reported by the second terminal 321. According to another embodiment, since the third terminal 322 accesses the MeNB 300 through the macro cell and the SeNB 310 through the small cell, the MeNB 300 may determine that the load of the third terminal 322 can be shared and determine the resources distribution ratio as "MeNB:SeNB=100:0" based on a received signal strength for the SeNB 310 reported by the third terminal 322. Here, the MeNB 300 may determine the resource distribution ratio based on the received signal strength of the SeNB 310 reported by the terminal. For example, the MeNB 300 may determine the resource distribution ratio such that the bearer resources between the SeNB 310 and the terminal are used more than the bearer resources between the MeNB 300 and the terminal as the received signal strength of the SeNB 310 reported by the terminal is higher, and determine the resource distribution ratio such that the bearer resources between the SeNB 310 and the terminal are used less than the bearer resources between the MeNB 300 and the terminal as the received signal strength of the SeNB 310 reported by the terminal is lower.

Figure 4:
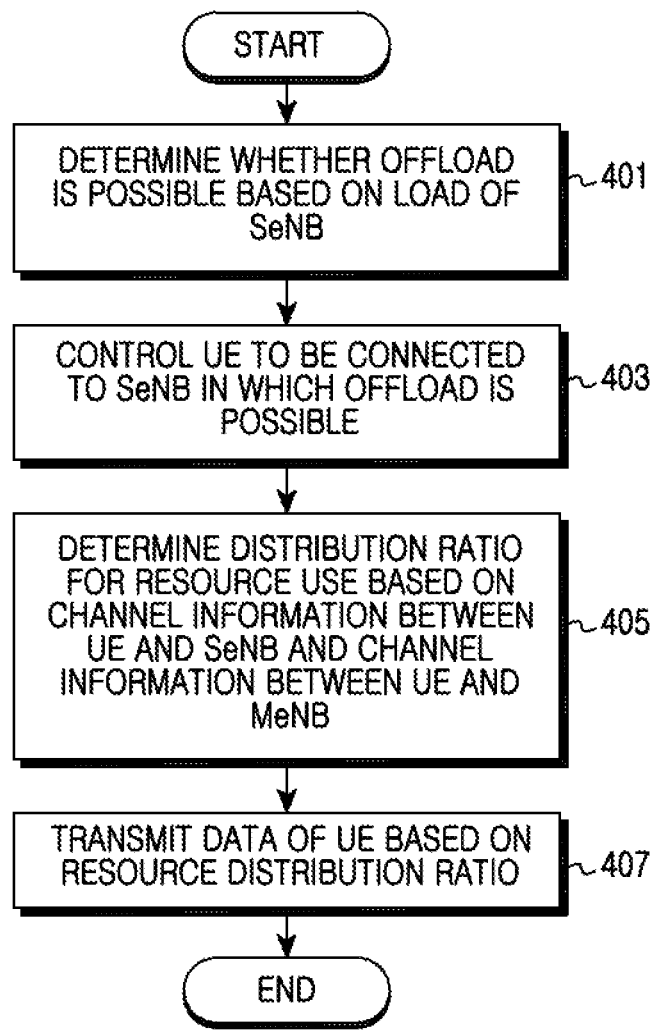
FIG. 4 illustrates a brief process in which the macro BS adaptively controls the flow of the terminal through bearer division according to an embodiment of the present invention.

FIG. 4 illustrates a brief process in which the macro BS adaptively controls a flow of the terminal through bearer division according to an embodiment of the present invention. Here, for convenience of the description, a process in which the macro BS adaptively controls a flow of one accessed terminal will be described.

Referring to FIG. 4, the MeNB determines whether the terminal can be offloaded based on load information of the SeNB received from at least one SeNB in step 401. For example, the MeNB may receive load information from SeNBs corresponding to at least one small cell that geographically overlaps the corresponding macro cell area, identify an SeNB, from which the terminal can receive a signal, among the SeNBs having transmitted the load information to the MeNB, and determine whether the identified SeNB can share the load of the MeNB for the corresponding terminal. The load information of the SeNB may include physical resource block (PRB) use rate information of the SeNB, buffer state information of the SeNB, and the number of terminals connected to the SeNB. Here, the PRB use rate information may refer to an amount of PRBs, which are being used for the terminals currently connected to the SeNB, among all the available PRBs. Further, the buffer state information of the SeNB corresponds to information indicating an amount of downlink data to be transferred to all terminals connected to the SeNB and may be determined based on an amount of downlink data stored in a buffer of the RLC layer.

When it is determined that the terminal can perform offloading to a particular SeNB, the MeNB may control the terminal to be connected to the particular SeNB to which the terminal can perform the offloading in step 403. For example, the MeNB may provide information on the small cell of the particular SeNB to the terminal and instruct the terminal to additionally access the small cell of the corresponding SeNB. Accordingly, the terminal may be in a dual connectivity state in which the terminal simultaneously accesses the MeNB and the SeNB by additionally accessing the small cell of the SeNB in a state where the terminal is accessing the macro cell of the MeNB.

Thereafter, the MeNB determines a distribution ratio of the resource use based on channel information between the terminal and the SeNB and channel information between the terminal and the MeNB in step 405. Here, the channel information may include a received signal strength and/or channel state information which the terminal measures based on a cell-specific reference signal (CRS) of the corresponding BS. Here, the received signal strength may include reference signal received power (RSRP) information, and the channel state information may include channel quality indicator (CQI). For example, the MeNB may determine a ratio between bearer resource of the MeNB and bearer resources of the SeNB to be used for terminal downlink transmission based on the channel information of each of the SeNB and the MeNB received from the terminal. In a more detailed example, with respect to downlink data transmission of the corresponding terminal, the MeNB may determine the resource distribution ratio such that the bearer resource between the SeNB and the terminal are used more than the bearer resources between the MeNB and the terminal as the received signal strength of the SeNB reported by the terminal is higher. Further, with respect to downlink data transmission of the corresponding terminal, the MeNB may determine the resource distribution ratio such that the bearer resource between the SeNB and the terminal are used less than the bearer resources between the MeNB and the terminal as the received signal strength of the SeNB reported by the terminal is lower.

Thereafter, the MeNB transmits downlink data of the terminal based on the determined resource distribution ratio. For example, the MeNB may partition the downlink data of the terminal according to the determined resource distribution ratio, and make a control to directly transmit some data to the terminal and transmit the remaining data to the terminal via the SeNB.

Thereafter, the MeNB according to an embodiment of the present invention ends the process of adaptively controlling the flow of the terminal.

Figure 5A:
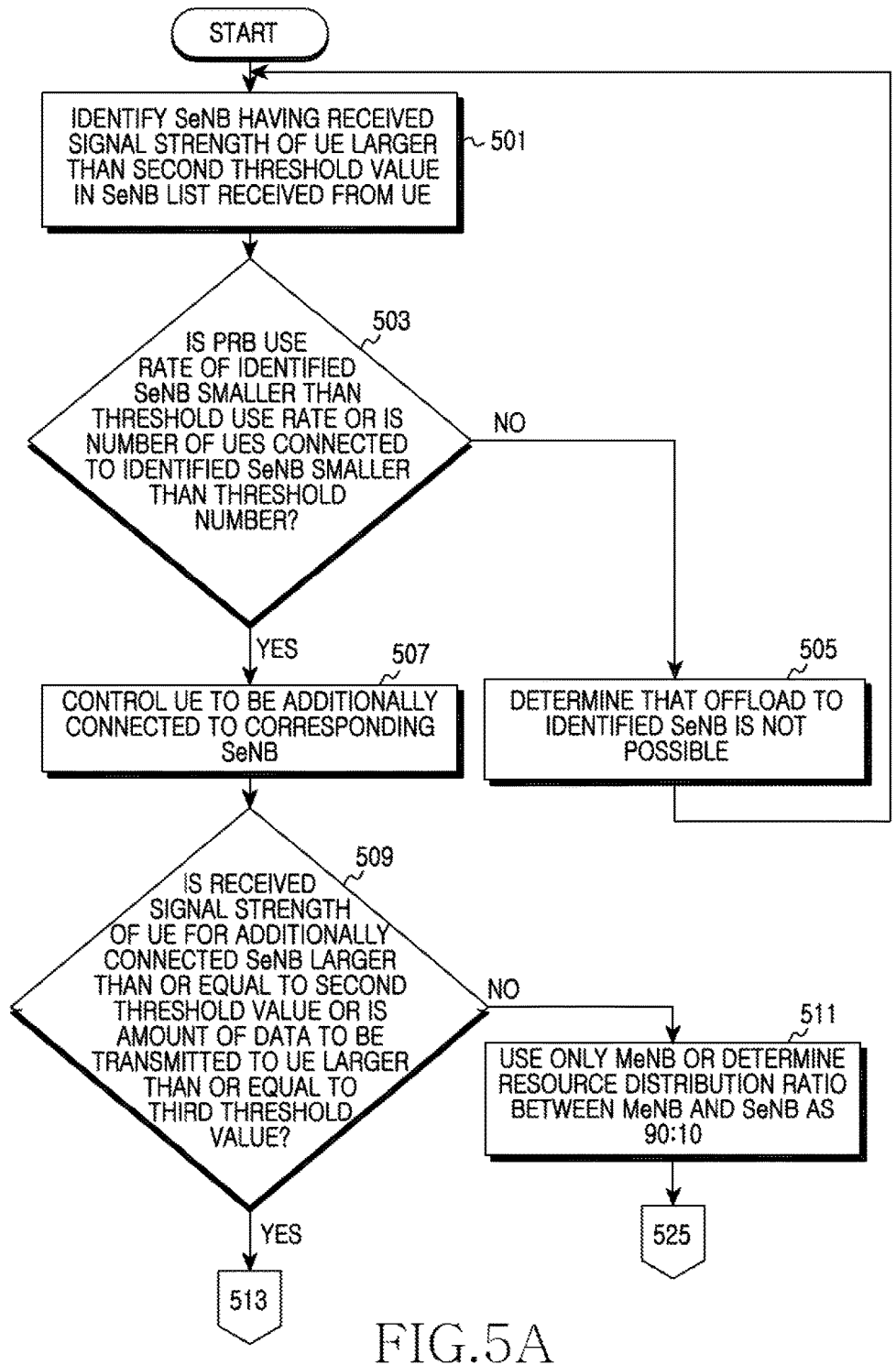
FIGS. 5A and 5B illustrate a detailed process in which the macro BS adaptively controls the flow of the terminal according to an embodiment of the present invention.
Figure 5B:
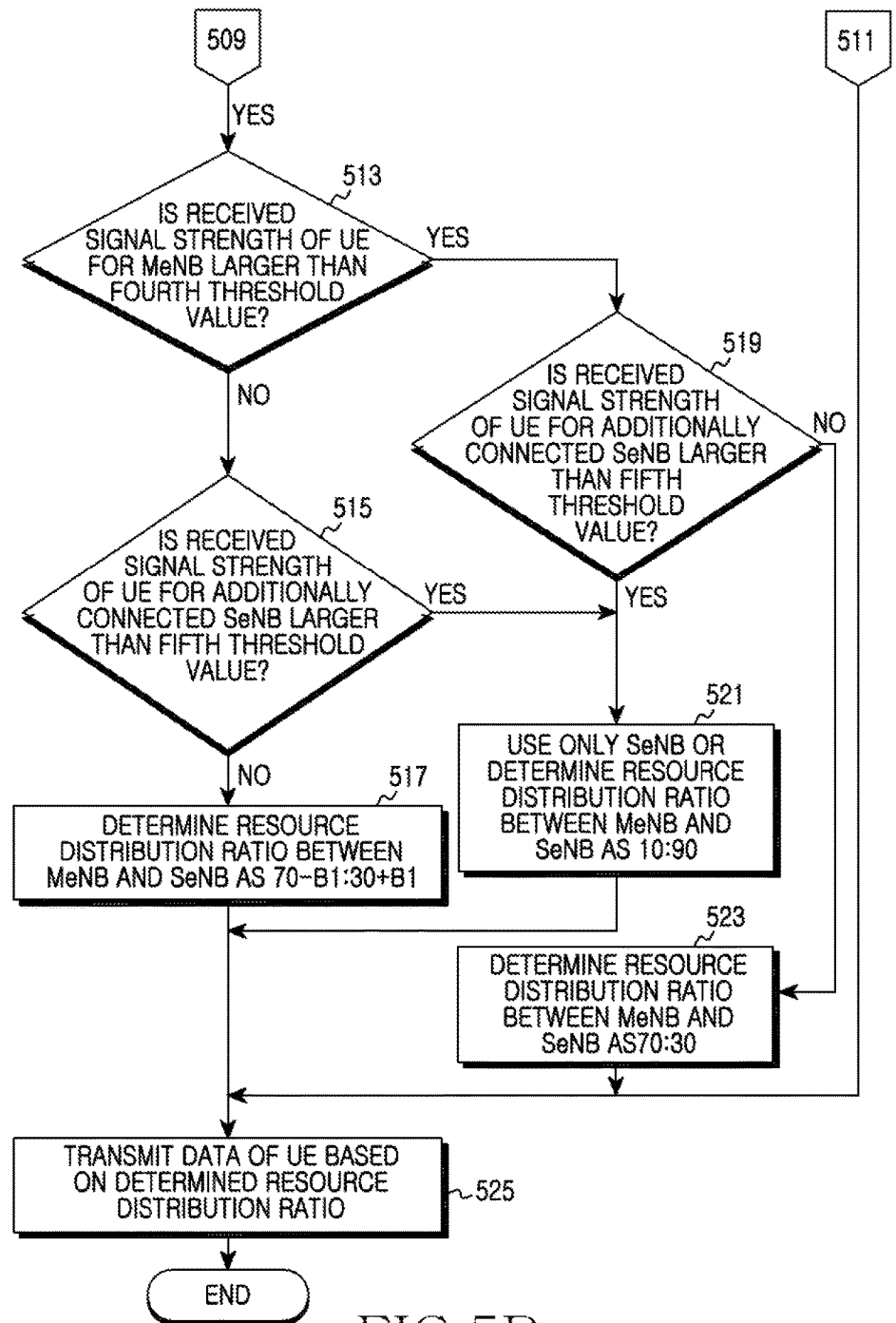

FIGS. 5A and 5B illustrate a detailed process in which the macro BS adaptively controls a flow of the terminal according to an embodiment of the present invention. FIG. 5 illustrates a process in which the macro BS controls dual connectivity and flow of the terminal in a state where the terminal accesses only the macro BS. Here, it is assumed that the macro BS periodically receives a report on load information and channel information from at least one small BS through an X2 interface and periodically receives a list including channel information between the terminal and the macro BS and channel information between the terminal and the small BS from the terminal. Hereinafter, for convenience of the description, using received signal strength information as the channel information will be described as an example. However, other information (for example, CQI) indicating a channel state may be used in the following embodiment of the present invention.

Referring to FIGS. 5A and 5B, the MeNB identifies an SeNB for which the received signal strength of the terminal is higher than a threshold value in an SeNB list received from the terminal in step 501. For example, the terminal may periodically receive a cell-specific reference signal (CRS) from at least one SeNB, measure a received signal strength, and periodically report a list including received signal strength information for the CRS of the SeNB to the MeNB. Accordingly, the MeNB determines whether there is the received signal strength higher than a second threshold value in the list received from the terminal and, when the received signal strength higher than the second threshold value exists, identifies the corresponding SeNB. When there is no received signal strength higher than the second threshold value in the list received from the terminal, the MeNB periodically re-performs step 501 until detecting the existence of the received signal strength higher than the second threshold value in the received list. According to some embodiments, the list received from the terminal may include only information on SeNBs for which the received signal strength is higher than the second threshold value.

Thereafter, the MeNB determines whether a PRB use rate of the identified SeNB is smaller than a threshold use rate (for example, X %) or the number of terminals connected to the identified SeNB is smaller than a threshold number in step 503. When the PRT use rate of the SeNB is larger than or equal to the threshold use rate and the number of terminals connected to the identified SeNB is larger than or equal to the threshold number, the MeNB proceeds to step 505 and determines that the offload to the identified SeNB is not possible. For example, due to the high load of the SeNB, the MeNB may determine that the load sharing by downlink data transmission of the terminal is not possible. Thereafter, the MeNB may wait until a preset period arrives and, when the preset period arrives, return to step 501 and re-perform the following steps. At this time, the terminal maintains the connected state only for the MeNB.

In contrast, when the PRB use rate of the SeNB is smaller than the threshold use rate or the number of terminals connected to the SeNB is smaller than the threshold number, the MeNB determines that the offload to the SeNB is possible and proceeds to step 507 to control the terminal to perform an additional connection to the corresponding SeNB. For example, due to the low load of the SeNB, the MeNB may determine that the load sharing by downlink data transmission of the terminal is possible and instruct the corresponding terminal to perform an additional connection to the SeNB. Here, the threshold use rate and the threshold number may be optimized through various methods. Further, according to some embodiments, in order to increase a possibility that the terminal is additionally connected to the SeNB, the threshold use rate may be set as large as possible (for example, 80% or larger) or the threshold number may be set as large as possible. Although, in order to determine whether the offload to the identified SeNB is performed, using the PRB use rate of the SeNB and the number of terminals connected to the SeNB has been described in step 503 to step 507 as an example, it may be determined whether the offload is performed based on buffer state information of the SeNB according to another embodiment.

Thereafter, the MeNB proceeds to step 509 and inspects whether a received signal strength of the terminal for the additionally connected SeNB is larger than or equal to the second threshold value or an amount of data, which the MeNB transmits to the terminal, is larger than or equal to a third threshold value. For example, since the channel state between the terminal and the SeNB can be dynamically changed, the MeNB may inspect whether a received signal strength of the terminal for the CRS of the corresponding SeNB is still larger than or equal to the second threshold value based on a list periodically reported from the terminal. Further, the MeNB may compare the amount of data to be transmitted to the terminal with the third threshold value and determine whether the offload for the downlink data by the terminal is required.

When the received signal strength of the terminal for the additionally connected SeNB is smaller than the second threshold value and the amount of data, which the MeNB transmits to the terminal, is smaller than the third threshold value, the MeNB may transmit the data by using only resources of the MeNB or determine a resource distribution ratio between the MeNB and the SeNB as "MeNB:SeNB=90:10" in step 511. Here, data transmission using only the resources of the MeNB may mean that the resource distribution rate is "MeNB:SeNB=100:0". Further, the resource distribution ratio of "MeNB:SeNB=90:10" is only an example, and is to indicate that the resources of the MeNB are used relatively more than the resources of the SeNB for the terminal downlink transmission when the received signal strength of the terminal for the additionally connected SeNB is smaller than the second threshold value or the amount of data, which the MeNB transmits to the terminal, is smaller than the third threshold value. Accordingly, the MeNB may determine the resource distribution ratio indicating that more resources of the MeNB are used compared to the resources of the SeNB in step 511. Thereafter, in step 525, the MeNB may transmit downlink data of the terminal based on the determined resource distribution ratio. For example, when it is determined that the data is transmitted using only the resources of the MeNB in step 511, the MeNB may directly transmit the data to the terminal without transmitting the downlink data of the terminal to the SeNB. According to another embodiment, when the resource distribution ratio is determined as "MeNB:SeNB=90:10" in step 511, the MeNB directly transmits 90% of the downlink data of the terminal to the terminal and transmits 10% of the downlink data to the SeNB. In this case, the 10% of the downlink data may be transmitted to the terminal by the SeNB.

In contrast, when the received signal strength of the terminal for the additionally connected SeNB is larger than or equal to the second threshold value and the amount of data, which the MeNB transmits to the terminal, is larger than the third threshold value, the MeNB identifies whether a received signal strength of the terminal for the MeNB is larger than a fourth threshold value based on channel information reported from the terminal in step 513.

Figure 7:
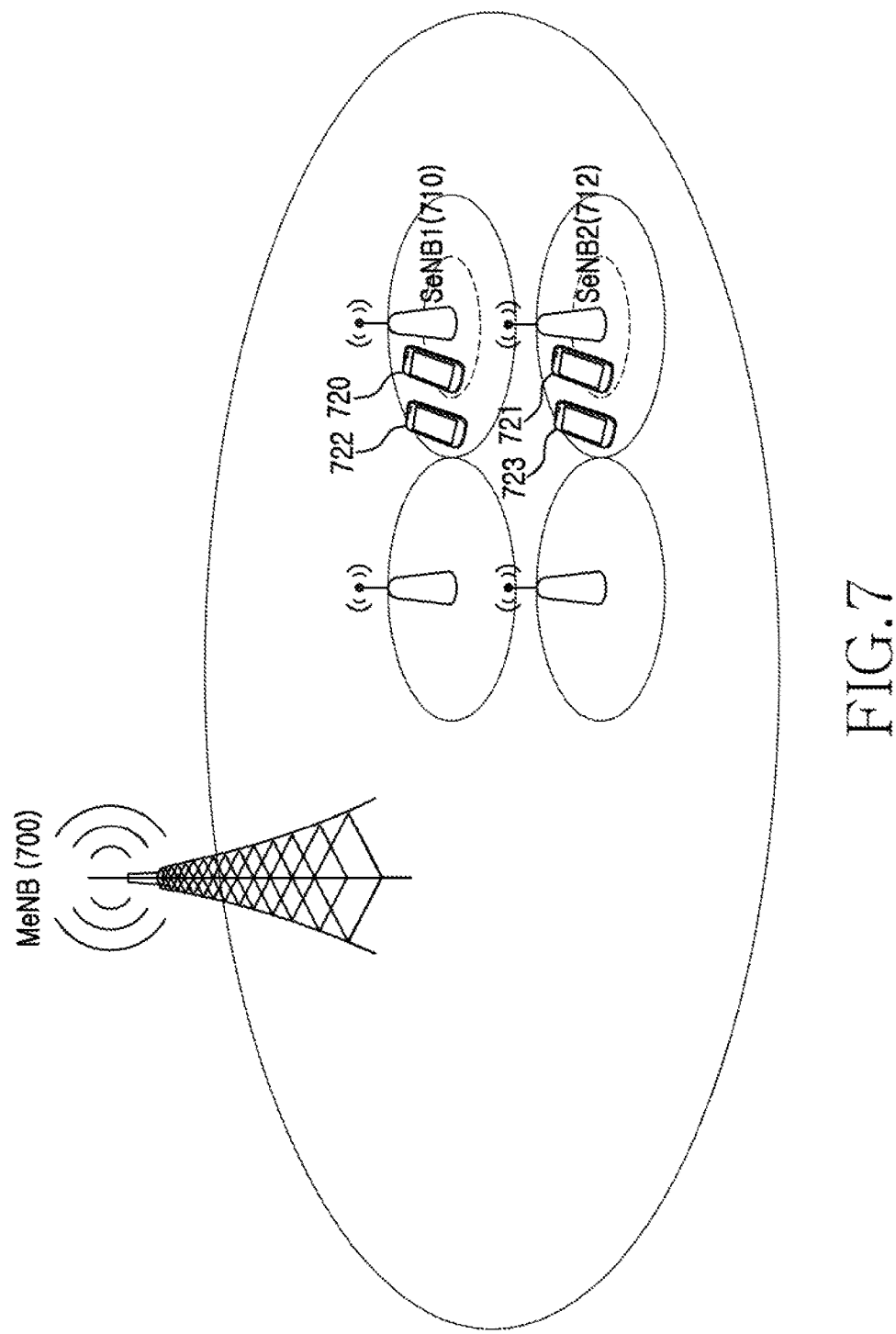
FIG. 7 illustrates an example in which the macro BS partitions resources based on a received signal strength of the dually connected terminal according to an embodiment of the present invention.

When the received signal strength of the terminal for the MeNB is larger than the fourth threshold value, the MeNB identifies whether the received signal strength of the terminal for the additionally connected SeNB is larger than a fifth threshold value in step 519. When the received signal strength of the terminal for the MeNB is larger than the fourth threshold value and the received signal strength of the terminal for the additionally connected SeNB is equal to or smaller than the fifth threshold value, the MeNB may determine the resource distribution ratio between the MeNB and the SeNB as "MeNB:SeNB=70:30" in step 523. For example, when the received signal strength of the terminal for the MeNB is larger than the fourth threshold value and the received signal strength of the terminal for the additionally connected SeNB is equal to or smaller than the fifth threshold value, the MeNB may estimate that the terminal 1 is located at a position 722, which is close to a cell boundary area of SeNB #1 710 but far from a boundary area of the macro cell among four terminal positions 720 to 723 as illustrated in FIG. 7 and determine the resource distribution ratio as "MeNB:SeNB=70:30" such that the resources of the MeNB are used more than the resources of the SeNB. Here, the resource distribution ratio of "MeNB:SeNB=70:30" is only an example and is to indicate the determination that relatively more resources of the MeNB are used compared to the resources of the SeNB for terminal downlink transmission. Accordingly, the MeNB may determine the resource distribution ratio indicating that more resources of the MeNB are used compared to the resources of the SeNB in step 523. Thereafter, in step 525, the MeNB may transmit downlink data of the terminal based on the determined resource distribution ratio. For example, when the resource distribution ratio is determined as "MeNB:SeNB=70:30" in step 523, the MeNB directly transmits 70% of the downlink data of the terminal to the terminal and transmits 30% of the downlink data to the SeNB. In this case, the 30% of the downlink data may be transmitted to the terminal by the SeNB.

In contrast, when the received signal strength of the terminal for the MeNB is larger than the fourth threshold value and the received signal strength of the terminal for the additionally connected SeNB is larger than the fifth threshold value, the MeNB may use only the resources of the SeNB or determine the resource distribution ratio between the MeNB and the SeNB as "MeNB:SeNB=10:90" in step 521. For example, when the received signal strength of the terminal for the MeNB is larger than the fourth threshold value and the received signal strength of the terminal for the additionally connected SeNB is larger than the fifth threshold value, the MeNB may estimate that the terminal is located at a position 720, which is close to the cell center of SeNB #1 710, among four terminal positions 720 to 723 as illustrated in FIG. 7 and determine the resource distribution ratio as "MeNB:SeNB=10:90" such that the resources of the SeNB are used more than the resources of the MeNB. Here, the resource distribution ratio of "MeNB:SeNB=10:90" is only an example and is to indicate the determination that relatively more resources of the SeNB are used compared to the resources of the MeNB for terminal downlink transmission. Accordingly, the MeNB may determine the resource distribution ratio indicating that more resources of the SeNB are used compared to the resources of the MeNB in step 521. Further, the determination that the MeNB uses only the resources of the SeNB may refer to the resource distribution ratio of "MeNB:SeNB=0:100". Thereafter, in step 525, the MeNB may transmit downlink data of the terminal based on the determined resource distribution ratio. For example, when the resource distribution ratio is determined as "MeNB:SeNB=10:90" in step 521, the MeNB directly transmits 10% of the downlink data of the terminal to the terminal and transmits 90% of the downlink data to the SeNB. In this case, the 90% of the downlink data may be transmitted to the terminal by the SeNB. According to another embodiment, when it is determined to use only the resources of the SeNB in step 521, the MeNB transfers the downlink data of the terminal to the SeNB without directly transmitting the downlink data to the terminal. In this case, all the downlink data of the terminal may be transmitted to the terminal through the SeNB.

Meanwhile, when the received signal strength of the terminal for the MeNB is equal to or smaller than the fourth threshold value, the MeNB identifies whether the received signal strength of the terminal for the additionally connected SeNB is larger than the fifth threshold value in step 515. When the received signal strength of the terminal for the MeNB is equal to or smaller than the fourth threshold value and the received signal strength of the terminal for the additionally connected SeNB is larger than the fifth threshold value, the MeNB may use only the resources of the SeNB or determine the resource distribution ratio between the MeNB and the SeNB as "MeNB:SeNB=10:90" in step 521. For example, when the received signal strength of the terminal for the MeNB is equal to or smaller than the fourth threshold value and the received signal strength of the terminal for the additionally connected SeNB is larger than the fifth threshold value, the MeNB may estimate that the terminal is located at a position 721, which is close to the cell center of SeNB #2 710, among four terminal positions 720 to 723 as illustrated in FIG. 7 and determine the resource distribution ratio as "MeNB:SeNB=10:90" such that the resources of the SeNB are used more than the resources of the MeNB. Here, the resource distribution ratio of "MeNB:SeNB=10:90" is only an example and is to indicate the determination that relatively more resources of the SeNB are used compared to the resources of the MeNB for terminal downlink transmission. Accordingly, the MeNB may determine the resource distribution ratio indicating that more resources of the SeNB are used compared to the resources of the MeNB in step 521. Further, the determination that the MeNB uses only the resources of the SeNB may refer to the resource distribution ratio of "MeNB:SeNB=0:100". Thereafter, in step 525, the MeNB may transmit downlink data of the terminal based on the determined resource distribution ratio. For example, when the resource distribution ratio is determined as "MeNB:SeNB=10:90" in step 521, the MeNB directly transmits 10% of the downlink data of the terminal to the terminal and transmits 90% of the downlink data to the SeNB. In this case, the 90% of the downlink data may be transmitted to the terminal by the SeNB. According to another embodiment, when it is determined to use only the resources of the SeNB in step 521, the MeNB transfers the downlink data of the terminal to the SeNB without directly transmitting the downlink data to the terminal. In this case, all the downlink data of the terminal may be transmitted to the terminal through the SeNB.

Meanwhile, when the received signal strength of the terminal for the MeNB is equal to or smaller than the fourth threshold value and the received signal strength of the terminal for the additionally connected SeNB is equal to or smaller than the fifth threshold value, the MeNB may determine the resource distribution ratio between the MeNB and the SeNB as "MeNB:SeNB=70−β1:30+β1" in step 517. For example, when the received signal strength of the terminal for the MeNB is equal to or smaller than the fourth threshold value and the received signal strength of the terminal for the additionally connected SeNB is equal to or smaller than the fifth threshold value, the MeNB may estimate that the terminal 1 is located at a position 723, which is close to a cell boundary area of SeNB #2 712 and also relatively close to a boundary area of the macro cell, among four terminal positions 720 to 723 as illustrated in FIG. 7 and determine the resource distribution ratio as "MeNB:SeNB=70−β1:30+β1" such that the resources of the MeNB are used more than the resources of the SeNB. Here, β1 is a value that allows the terminal estimated to be located at the position 723 among the four positions illustrated in FIG. 7 to use relatively less resources of the MeNB and relatively more resources of the SeNB compared to the terminal estimated to be located at the position 722. Here, the resource distribution ratio of "MeNB:SeNB=70−β1:30+β1" is only an example and is to indicate the determination that relatively more resources of the MeNB are used compared to the resources of the SeNB for terminal downlink transmission. Accordingly, the MeNB may determine the resource distribution ratio indicating that more resources of the MeNB are used compared to the resources of the SeNB in step 523. Thereafter, in step 525, the MeNB may transmit downlink data of the terminal based on the determined resource distribution ratio. For example, when the resource distribution ratio is determined as "MeNB:SeNB=70−β1:30+β1" in step 523, the MeNB directly transmits 70−β1% of the downlink data of the terminal to the terminal and transmits 30+β1% of the downlink data to the SeNB. In this case, the 30+β1% of the downlink data may be transmitted to the terminal by the SeNB.

Thereafter, the MeNB according to an embodiment of the present invention ends the process of adaptively controlling the flow of the terminal. For example, when the terminal is in a dual connectivity state, the MeNB may perform the process illustrated in FIG. 6 after performing step 525.

Figure 6:
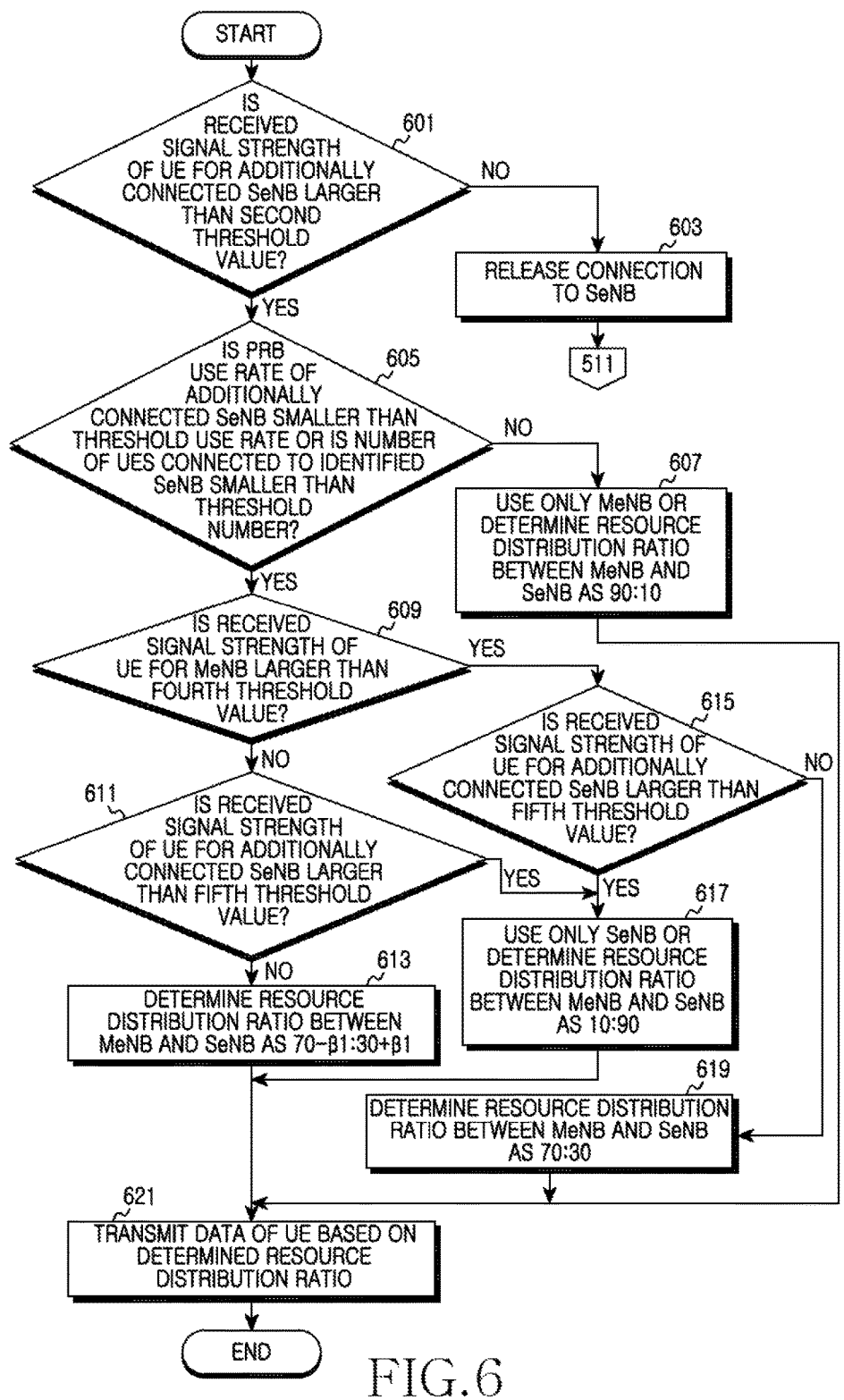
FIG. 6 illustrates a detailed process in which the macro BS adaptively controls the flow of the terminal according to another embodiment of the present invention.

FIG. 6 illustrates a detailed process in which the macro BS adaptively controls the flow of the terminal according to another embodiment of the present invention. FIG. 6 illustrates a process in which the macro BS controls the flow of the terminal in a state where the terminal is dually connected to the macro BS and the small BS. Here, it is assumed that the macro BS periodically receives a report on load information and channel information from at least one small BS through an X2 interface and periodically receives a list including channel information between the terminal and the macro BS and channel information between the terminal and the small BS from the terminal. Hereinafter, for convenience of the description, using received signal strength information as the channel information will be described as an example. However, other information (for example, CQI) indicating a channel state may be used in the following embodiment of the present invention.

Referring to FIG. 6, the MeNB inspects whether the received signal strength of the terminal for the additionally connected SeNB is larger than the second threshold value in step 601. Here, the additionally connected SeNB refers to an SeNB which the terminal additionally accesses according to the embodiment of FIG. 5. The terminal may periodically receive a cell-specific reference signal (CRS) from the additionally connected SeNB, measure a received signal strength, and periodically report received signal strength information for the CRS of the SeNB to the MeNB. Accordingly, the MeNB may compare the received signal strength information for the CRS of the SeNB received from the terminal with the second threshold value.

When the received signal strength of the terminal for the additionally connected SeNB is equal to or smaller than the second threshold value, the MeNB may determine that the terminal has difficulty in receiving a service from the SeNB and control the release of the connectivity of the terminal to the SeNB in step 603. According to some embodiments, when the received signal strength of the terminal for the SeNB is equal to or smaller than the second threshold value, the connectivity of the terminal to the SeNB may be released even though the MeNB does not perform a separate control operation. Since the connectivity of the terminal to the SeNB is released, the MeNB may return to step 501 of FIG. 5 and re-perform the following steps for the dual connectivity of the terminal In contrast, when the received signal strength of the terminal for the additionally connected SeNB is larger than the second threshold, the MeNB determines whether the PRB use rate of the additionally connected SeNB is smaller than the threshold use rate (for example, X %) or the number of terminals connected to the identified SeNB is smaller than the threshold number in step 605. When the PRB use rate of the SeNB is larger than or equal to the threshold use rate and the number of terminals connected to the identified SeNB is larger than or equal to the threshold number, the MeNB may transmit data by using only the resources of the MeNB or determine the resource distribution ratio between the MeNB and the SeNB as "MeNB:SeNB=90:10" in step 607. Here, data transmission using only the resources of the MeNB may mean that the resource distribution rate is "MeNB:SeNB=100:0". Further, the resource distribution ratio of "MeNB:SeNB=90:10" is only an example, and may indicate that the resources of the MeNB are used relatively more than the resources of the SeNB for the terminal downlink transmission when the received signal strength of the terminal for the additionally connected SeNB is smaller than the second threshold value or the amount of data, which the MeNB transmits to the terminal, is smaller than the third threshold value. Accordingly, the MeNB may determine the resource distribution ratio indicating that more resources of the MeNB are used compared to the resources of the SeNB in step 511. Thereafter, in step 621, the MeNB may transmit downlink data of the terminal based on the determined resource distribution ratio. For example, when it is determined that the data is transmitted using only the resources of the MeNB in step 607, the MeNB may directly transmit the data to the terminal without transmitting the downlink data of the terminal to the SeNB. According to another embodiment, when the resource distribution ratio is determined as "MeNB:SeNB=90:10" in step 607, the MeNB directly transmits 90% of the downlink data of the terminal to the terminal and transmits 10% of the downlink data to the SeNB. In this case, the 10% of the downlink data may be transmitted to the terminal by the SeNB.

In contrast, when the PRB use rate of the SeNB is smaller than the threshold use rate or the number of terminals connected to the SeNB is smaller than the threshold number, the MeNB identifies whether the received signal strength of the terminal for the MeNB is larger than the fourth threshold value based on channel information reported from the terminal in step 609.

When the received signal strength of the terminal for the MeNB is larger than the fourth threshold value, the MeNB identifies whether the received signal strength of the terminal for the additionally connected SeNB is larger than a fifth threshold value in step 615. When the received signal strength of the terminal for the MeNB is larger than the fourth threshold value and the received signal strength of the terminal for the additionally connected SeNB is equal to or smaller than the fifth threshold value, the MeNB may determine the resource distribution ratio between the MeNB and the SeNB as "MeNB:SeNB=70:30" in step 619. For example, when the received signal strength of the terminal for the MeNB is larger than the fourth threshold value and the received signal strength of the terminal for the additionally connected SeNB is equal to or smaller than the fifth threshold value, the MeNB may estimate that the terminal 1 is located at a position 722, which is close to a cell boundary area of SeNB #1 710 but far from a boundary area of the macro cell among four terminal positions 720 to 723 as illustrated in FIG. 7 and determine the resource distribution ratio as "MeNB:SeNB=70:30" such that the resources of the MeNB are used more than the resources of the SeNB. Here, the resource distribution ratio of "MeNB:SeNB=70:30" is only an example and is to indicate the determination that relatively more resources of the MeNB are used compared to the resources of the SeNB for terminal downlink transmission. Accordingly, the MeNB may determine the resource distribution ratio indicating that more resources of the MeNB are used compared to the resources of the SeNB in step 619. Thereafter, in step 621, the MeNB may transmit downlink data of the terminal based on the determined resource distribution ratio. For example, when the resource distribution ratio is determined as "MeNB:SeNB=70:30" in step 619, the MeNB directly transmits 70% of the downlink data of the terminal to the terminal and transmits 30% of the downlink data to the SeNB. In this case, the 30% of the downlink data may be transmitted to the terminal by the SeNB.

In contrast, when the received signal strength of the terminal for the MeNB is larger than the fourth threshold value and the received signal strength of the terminal for the additionally connected SeNB is larger than the fifth threshold value, the MeNB may use only the resources of the SeNB or determine the resource distribution ratio between the MeNB and the SeNB as "MeNB:SeNB=10:90" in step 617. For example, when the received signal strength of the terminal for the MeNB is larger than the fourth threshold value and the received signal strength of the terminal for the additionally connected SeNB is larger than the fifth threshold value, the MeNB may estimate that the terminal is located at a position 720, which is close to the cell center of SeNB #1 710, among four terminal positions 720 to 720 as illustrated in FIG. 7 and determine the resource distribution ratio as "MeNB:SeNB=10:90" such that the resources of the SeNB are used more than the resources of the MeNB. Here, the resource distribution ratio of "MeNB:SeNB=10:90" is only an example and is to indicate the determination that relatively more resources of the SeNB are used compared to the resources of the MeNB for terminal downlink transmission. Accordingly, the MeNB may determine the resource distribution ratio indicating that more resources of the SeNB are used compared to the resources of the MeNB in step 617. Further, the determination that the MeNB uses only the resources of the SeNB may refer to the resource distribution ratio of "MeNB:SeNB=0:100". Thereafter, in step 621, the MeNB may transmit downlink data of the terminal based on the determined resource distribution ratio. For example, when the resource distribution ratio is determined as "MeNB:SeNB=10:90" in step 617, the MeNB directly transmits 10% of the downlink data of the terminal to the terminal and transmits 90% of the downlink data to the SeNB. In this case, the 90% of the downlink data may be transmitted to the terminal by the SeNB. According to another embodiment, when it is determined to use only the resources of the SeNB in step 617, the MeNB transfers the downlink data of the terminal to the SeNB without directly transmitting the downlink data to the terminal. In this case, all the downlink data of the terminal may be transmitted to the terminal through the SeNB.

Meanwhile, when the received signal strength of the terminal for the MeNB is equal to or smaller than the fourth threshold value, the MeNB identifies whether the received signal strength of the terminal for the additionally connected SeNB is larger than the fifth threshold value in step 611. When the received signal strength of the terminal for the MeNB is equal to or smaller than the fourth threshold value and the received signal strength of the terminal for the additionally connected SeNB is larger than the fifth threshold value, the MeNB may use only the resources of the SeNB or determine the resource distribution ratio between the MeNB and the SeNB as "MeNB:SeNB=10:90" in step 617. For example, when the received signal strength of the terminal for the MeNB is equal to or smaller than the fourth threshold value and the received signal strength of the terminal for the additionally connected SeNB is larger than the fifth threshold value, the MeNB may estimate that the terminal is located at a position 721, which is close to the cell center of SeNB #2 710, among four terminal positions 720 to 723 as illustrated in FIG. 7 and determine the resource distribution ratio as "MeNB:SeNB=10:90" such that the resources of the SeNB are used more than the resources of the MeNB. Here, the resource distribution ratio of "MeNB:SeNB=10:90" is only an example and is to indicate the determination that relatively more resources of the SeNB are used compared to the resources of the MeNB for terminal downlink transmission. Accordingly, the MeNB may determine the resource distribution ratio indicating that more resources of the SeNB are used compared to the resources of the MeNB in step 617. Further, the determination that the MeNB uses only the resources of the SeNB may refer to the resource distribution ratio of "MeNB:SeNB=0:100". Thereafter, in step 621, the MeNB may transmit downlink data of the terminal based on the determined resource distribution ratio. For example, when the resource distribution ratio is determined as "MeNB:SeNB=10:90" in step 617, the MeNB directly transmits 10% of the downlink data of the terminal to the terminal and transmits 90% of the downlink data to the SeNB. In this case, the 90% of the downlink data may be transmitted to the terminal by the SeNB. According to another embodiment, when it is determined to use only the resources of the SeNB in step 617, the MeNB transfers the downlink data of the terminal to the SeNB without directly transmitting the downlink data to the terminal. In this case, all the downlink data of the terminal may be transmitted to the UE through the SeNB.

Meanwhile, when the received signal strength of the terminal for the MeNB is equal to or smaller than the fourth threshold value and the received signal strength of the terminal for the additionally connected SeNB is equal to or smaller than the fifth threshold value, the MeNB may determine the resource distribution ratio between the MeNB and the SeNB as "MeNB:SeNB=70−β1:30+β1" in step 613. For example, when the received signal strength of the terminal for the MeNB is equal to or smaller than the fourth threshold value and the received signal strength of the terminal for the additionally connected SeNB is equal to or smaller than the fifth threshold value, the MeNB may estimate that the terminal 1 is located at a position 723, which is close to a cell boundary area of SeNB #2 712 and also relatively close to a boundary area of the macro cell, among four terminal positions 720 to 723 as illustrated in FIG. 7 and determine the resource distribution ratio as "MeNB:SeNB=70−β1:30+β1" such that the resources of the MeNB are used more than the resources of the SeNB. Here, (31 is a value that allows the terminal estimated to be located at the position 723 among the four positions illustrated in FIG. 7 to use relatively less resources of the MeNB and relatively more resources of the SeNB compared to the terminal estimated to be located at the position 722. Here, the resource distribution ratio of "MeNB:SeNB=70−β1:30+β1" is only an example and is to indicate the determination that the relatively more resources of the MeNB are used compared to the resources of the SeNB for terminal downlink transmission. Accordingly, the MeNB may determine the resource distribution ratio indicating that more resources of the MeNB are used compared to the resources of the SeNB in step 613. Thereafter, in step 621, the MeNB may transmit downlink data of the terminal based on the determined resource distribution ratio. For example, when the resource distribution ratio is determined as "MeNB:SeNB=70−β1:30+β1" in step 613, the MeNB directly transmits 70−β1% of the downlink data of the terminal to the terminal and transmits 30+β1% of the downlink data to the SeNB. In this case, the 30+β1% of the downlink data may be transmitted to the terminal by the SeNB.

Thereafter, the MeNB according to an embodiment of the present invention may end the process of adaptively controlling the flow of the terminal. The MeNB may re-perform the process according to the embodiment of FIG. 6 on every preset period.

Figure 8:
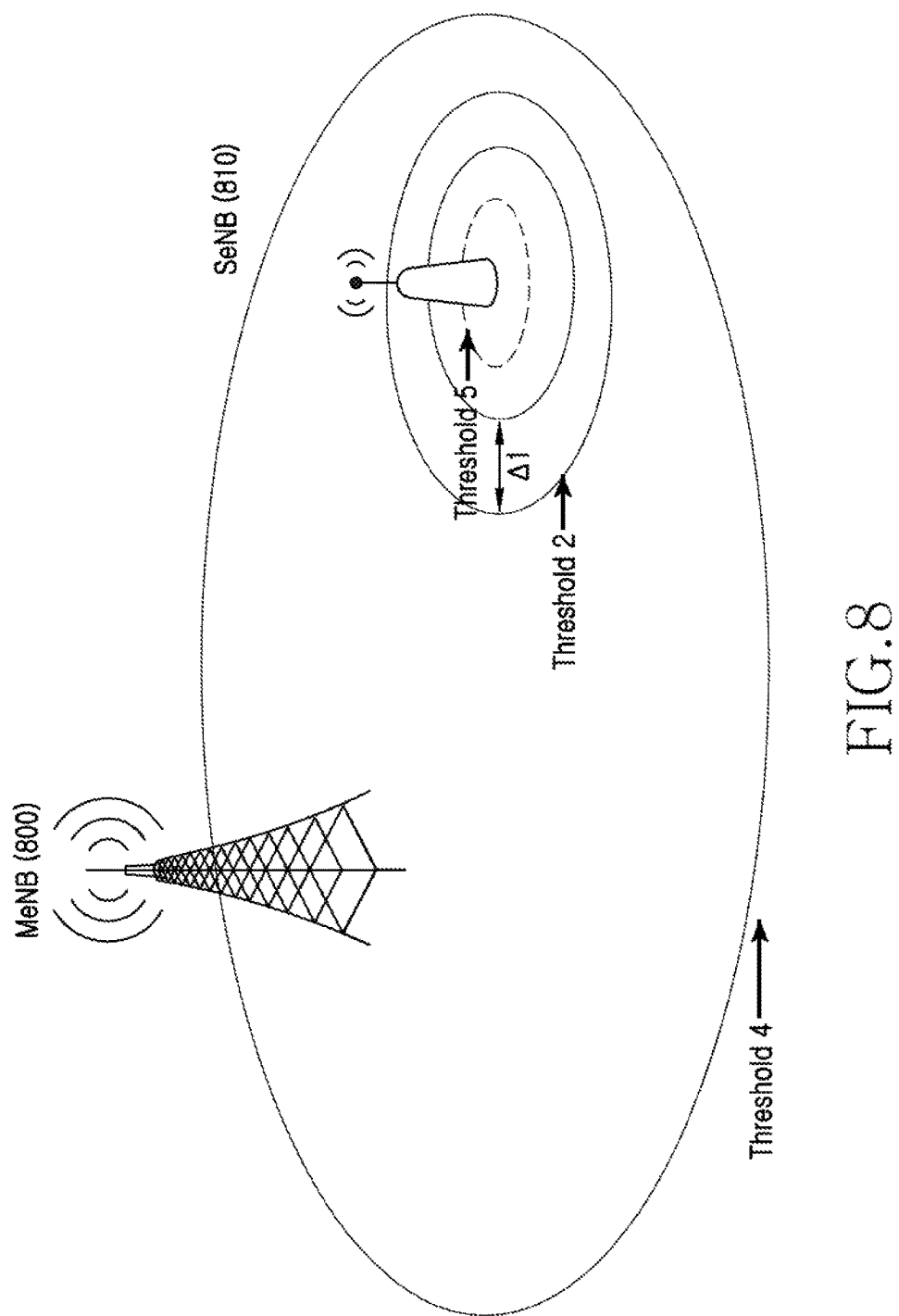
FIG. 8 illustrates a relationship between threshold values according to an embodiment of the present invention.

The embodiments of FIGS. 5A, 5B, and 6 have described that the MeNB compares the received signal strength of the terminal, which has performs dual connectivity, for the SeNB with the second threshold value and the fifth threshold value and the received signal strength of the terminal for the MeNB with the fourth threshold value, so as to estimate the position where the corresponding terminal exists among the four positions 720 to 723 illustrated in FIG. 7 and determine the resource distribution ratio based on the estimated position. However, according to some embodiments, as illustrated in FIG. 8, the MeNB may additionally set a threshold value larger than the second threshold value by Δ1 to more accurately estimate the position of the terminal and determine the resource distribution ratio based on the accurately estimated position. In other words, according to another embodiment of the present invention, a new threshold value (second threshold value +Δ1) may be set between the second threshold value and the fifth threshold value that are the threshold values for the received signal strength of an SeNB 810. At this time, when the received signal strength of the terminal for the MeNB is larger than the fourth threshold value and received signal strength of the terminal for the SeNB 810 is larger than or equal to the new threshold value (second threshold value +Δ1) and smaller than the fifth threshold value, the MeNB 800 may set the resource distribution ratio between the MeNB 800 and the SeNB 810 as "MeNB:SeNB=50:50". Further, when the received signal strength of the terminal for the MeNB 800 is equal to or smaller than the fourth threshold value and the received signal strength of the terminal for the SeNB 810 is larger than or equal to the new threshold value (second threshold value +Δ1) and smaller than the fifth threshold value, the MeNB 800 may set the resource distribution ratio between the MeNB 800 and the SeNB 810 as "MeNB:SeNB=50−β1:50+β1".

Figure 9:
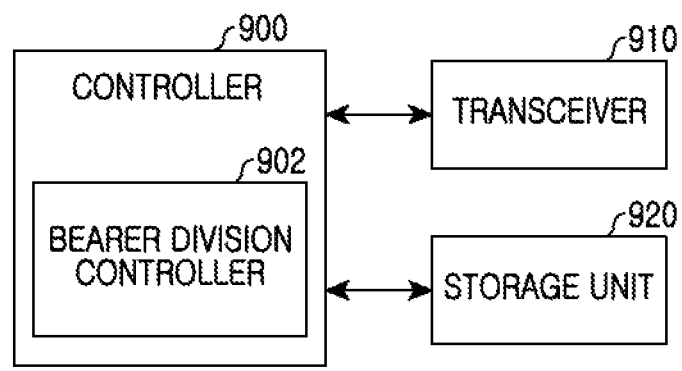
FIG. 9 is a block diagram briefly illustrating the macro BS according to an embodiment of the present invention.

FIG. 9 is a block diagram briefly illustrating the macro BS according to an embodiment of the present invention.

Referring to FIG. 9, the macro BS may include a controller 900, a transceiver 910, and a storage unit 920.

The controller 900 controls and processes the general operation for providing a communication service to the terminal. Particularly, the controller 900 according to an embodiment of the present invention includes a bearer division controller 902 and controls and processes dual connectivity of the terminal that is accessing the macro BS. For example, the bearer division controller 902 determines whether to share the load of the terminal with the small cell based on channel information received from the terminal and load information received from the BS of the small cell. When it is determined to share the load of the terminal with the small cell, the bearer division controller 902 may instruct the terminal to perform additional access to the BS of the small cell. Here, the load information may include load information of each of at least one cell corresponding to at least one carrier supported by the corresponding small BS. Further, the load information may include physical resource block (PRB) use rate information of the small BS, buffer state information of the small BS, and the number of terminals connected to the small BS.

The bearer division controller 902 may adaptively control the flow of the terminal that is dually connected to the macro BS and the small BS. For example, the bearer division controller 902 may determine a resource distribution ratio between the macro BS and the small BS for downlink data transmission of the corresponding terminal based on channel information received from the terminal that is dually connected to the macro BS and the small BS. Here, the channel information may include a received signal strength which the terminal measures based on a cell-specific reference signal (CRS) of the corresponding BS and channel state information. Further, the received signal strength may include reference signal received power (RSRP) information, and the channel state information may include channel quality indicator (CQI). In addition, the bearer division controller 902 may determine the resource distribution ratio between the macro BS and the small BS based on an amount of downlink data to be transmitted to the corresponding terminal. For example, the bearer division controller 902 may determine the resource distribution ratio between the macro BS and the small BS in the same way as described in FIGS. 5 and 6.

Further, the bearer division controller 902 controls and processes a function for transmitting downlink data of the terminal according to the determined resource distribution ratio. The bearer division controller 902 may control the macro BS to directly transmit some of the downlink data of the terminal to the terminal and the remaining data to the terminal through the small BS according to the determined resource distribution ratio. According to another embodiment, the bearer division controller may control the macro BS to transmit all downlink data of the terminal to the terminal or may transfer all downlink data of the terminal to the small BS and enable the small BS to transmit the downlink data to the terminal according to the determined resource distribution ratio.

The transceiver 910 performs a function for transmitting and receiving a signal to and from the terminal through at least one antenna. Although not illustrated in FIG. 9, the transceiver 910 may include a plurality of encoders, a plurality of modulators, a plurality of subcarrier mapping units, a plurality of modulators, and a plurality of RF transmitters. Further, the transceiver 910 performs a function for transmitting and receiving a signal to and from at least one small BS through an X2 interface.

The storage unit 920 stores various pieces of data and programs required for the operation of the BS. The storage unit 920 may store channel state information, load information of the small BS, and information on an amount of downlink data to be transmitted to the terminal received from the terminal according to an embodiment of the present invention.

According to an embodiment of the present invention, a method of a master base station (BS) in a wireless communication system in which BSs having different size cells coexist may include: an operation of receiving load information from at least one other BS; an operation of receiving channel information of the at least one other BS from a terminal accessing the master BS; an operation of determining a secondary BS, which can share a load of the terminal, based on the channel information and the load information; and an operation of making a request for additional access to the secondary BS to the terminal.

According to an embodiment of the present invention, the method of the master BS may further include: an operation of determining a resource distribution ratio between resources of the master BS and resources of the secondary BS; and an operation of processing transmission of data to the terminal by using the resources of the master BS and the resources of the secondary BS according to the determined resource distribution ratio.

According to an embodiment of the present invention, the resource distribution ratio may be determined based on at least one of channel information received from the terminal, load information of the secondary BS among the load information of the at least one other BS, and an amount of data to be transmitted to the terminal According to an embodiment of the present invention, the channel information received from the terminal may include channel information between the terminal and the master BS and channel information between the terminal and the secondary BS, and the channel information includes at least one of a received signal strength measured based on a cell-specific reference signal (CRS) of the BS and channel quality information.

According to an embodiment of the present invention, the load information of the secondary BS may include at least one of a resource use rate of the secondary BS, a number of terminals connected to the secondary BS, and buffer state information of the secondary BS.

According to an embodiment of the present invention, the operation of determining the secondary BS, which can share the load of the terminal, based on the channel information and the load information may include: an operation of identifying at least one other BS having a channel state with the terminal, which meets a preset condition, among the at least one other BS based on the channel information; and an operation of determining a BS having a resource use rate smaller than a threshold use rate among the identified at least one other BS as the secondary BS which can share the load of the terminal.

According to an embodiment of the present invention, the operation of determining the secondary BS, which can share the load of the terminal, based on the channel information and the load information may include: an operation of identifying at least one other BS having a channel state with the terminal, which meets a preset condition, among the at least one other BS based on the channel information; and an operation of determining a BS having a number of terminals connected thereto, which is smaller than a threshold number, among the identified at least one other BS as the secondary BS which can share the load of the terminal.

According to an embodiment of the present invention, the operation of determining the resource distribution ratio between the resources of the master BS and the resources of the secondary BS may include: an operation of comparing the received signal strength of the secondary BS with a first threshold value and a second threshold value; an operation of, when the received signal strength of the secondary BS is larger than the first threshold value and equal to or smaller than the second threshold value, determining the resource distribution ratio such that the resources of the master BS are used more than the resources of the secondary BS; and an operation of, when the received signal strength of the secondary BS is larger than the first threshold value and the second threshold value, determining the resource distribution ratio such that the resources of the secondary BS are used more than the resources of the master BS.

According to an embodiment of the present invention, when the received signal strength of the secondary BS is larger than the first threshold value and equal to or smaller than the second threshold value, the operation of determining the resource distribution ratio such that the resources of the master BS are used more than the resources of the secondary BS may include: an operation of comparing the received signal strength of the master BS with a third threshold value; and an operation of determining the resource distribution ratio such that a resource use rate of the master BS when the received signal strength of the master BS is larger than the third threshold value is larger than a resource use rate of the mater BS when the received signal strength of the master BS is equal to or smaller than the third threshold value.

According to an embodiment of the present invention, the operation of determining the resource distribution ratio between the resources of the master BS and the resources of the secondary BS may include: an operation of comparing an amount of data, which the master BS transmits to the terminal, with a fourth threshold value; and an operation of, when the amount of the data, which the master BS transmits to the terminal, is smaller than the fourth threshold value, determining the resource distribution ratio such as only the resources of the master BS are used.

According to an embodiment of the present invention, an apparatus of a master BS in a wireless communication system in which BSs having different size cells coexist may include: a communication unit configured to receive load information from at least one other base station (BS) and receive channel information of the at least one other BS from a terminal accessing the master BS; and a controller configured to determine a secondary BS, which can share a load of the terminal, based on the channel information and the load information. The communication unit is further configured to transmit a request for additional access to the secondary BS to the terminal.

According to an embodiment of the present invention, the controller may make a control to determine a resource distribution ratio between resources of the master BS and resources of the secondary BS and to process transmission of data to the terminal by using the resources of the master BS and the resources of the secondary BS according to the determined resource distribution ratio.

According to an embodiment of the present invention, the resource distribution ratio may be determined based on at least one of channel information received from the terminal, load information of the secondary BS among the load information of the at least one other BS, and an amount of data to be transmitted to the terminal According to an embodiment of the present invention, the channel information received from the terminal may include channel information between the terminal and the master BS and channel information between the terminal and the secondary BS, and the channel information includes at least one of a received signal strength measured based on a cell-specific reference signal (CRS) of the BS and channel quality information.

According to an embodiment of the present invention, the load information of the secondary BS may include at least one of a resource use rate of the secondary BS, a number of terminals connected to the secondary BS, and buffer state information of the secondary BS.

According to an embodiment of the present invention, the controller may identify at least one other BS having a channel state with the terminal, which meets a preset condition, based on the channel information and determine a BS having a resource use rate smaller than a threshold use rate among the identified at least one other BS as the secondary BS which can share the load of the terminal.

According to an embodiment of the present invention, the controller may identify at least one other BS having a channel state with the terminal, which meets a preset condition, based on the channel information and determine a BS having a number of terminals connected thereto, which is smaller than a threshold number, among the identified at least one other BS as the secondary BS which can share the load of the terminal According to an embodiment of the present invention, the controller may compare the received signal strength of the secondary BS with a first threshold value and a second threshold value, when the received signal strength of the secondary BS is larger than the first threshold value and equal to or smaller than the second threshold value, determine the resource distribution ratio such that the resources of the master BS are used more than the resources of the secondary BS, and, when the received signal strength of the secondary BS is larger than the first threshold value and the second threshold value, determine the resource distribution ratio such that the resources of the secondary BS are used more than the resources of the master BS.

According to an embodiment of the present invention, when the received signal strength of the secondary BS is larger than the first threshold value and smaller than the second threshold value, the controller may compare the received signal strength of the master BS with a third threshold value and determine the resource distribution ratio such that a resource use rate of the master BS when the received signal strength of the master BS is larger than the third threshold value is larger than a resource use rate of the mater BS when the received signal strength of the master BS is equal to or smaller than the third threshold value.

According to an embodiment of the present invention, the controller may compare an amount of data, which the master BS transmits to the terminal, with a fourth threshold value, and, when the amount of the data, which the master BS transmits to the terminal, is smaller than the fourth threshold value, determine the resource distribution ratio such as only the resources of the master BS are used.

Although the present invention has been described by the restricted embodiments and the drawings as described above, the present invention is not limited to the aforementioned embodiments and various modifications and alterations can be made from the descriptions by those skilled in the art to which the present invention pertains.

The operations according to embodiments of the present invention may be implemented by a single controller. In this case, program instructions for performing various computer-implemented operations may be stored in a computer-readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command Examples of the program command include a machine language code generated by a compiler and a high-level language code executable by a computer through an interpreter and the like. When all or some of the base stations or relays as described in the present invention are implemented by a computer program, a computer-readable recording medium in which the computer program is stored also falls within the scope of the present invention. Therefore, the scope of the present invention should not be defined as being limited to the embodiments, but should be defined by the appended claims and equivalents thereof.

The invention claimed is:

1. A method of a master base station (BS) in a wireless communication system in which BSs having different size cells coexist, the method comprising:
   receiving, from at least one other BS, load information of the at least one other BS;
   determining a secondary BS among the at least one other BS based on load information of the secondary BS;
   transmitting, to a terminal, information requesting for an access of the terminal to the secondary BS;
   receiving, from the terminal, first channel state information of a channel between the master BS and the terminal, and second channel state information of a channel between the secondary BS and the terminal after accessing the terminal to the secondary BS;
   determining a first amount of data and a second amount of data based on the first channel state information and the second channel state information;
   transmitting, to the terminal, the first amount of data; and
   controlling the secondary BS to transmit the second amount of data.

2. The method of claim 1, further comprising:
   determining a resource distribution ratio between resources of the master BS and resources of the secondary BS; and
   processing transmission of data to the terminal by using the resources of the master BS and the resources of the secondary BS according to the determined resource distribution ratio.

3. The method of claim 2, wherein the resource distribution ratio is determined based on at least one of the first channel state information, the second channel state information, the load information of the secondary BS and an amount of data to be transmitted to the terminal.

4. The method of claim 3,
   wherein the first channel state information and the second channel state information include at least one of a received signal strength measured based on a cell-specific reference signal (CRS) of the master BS or the secondary BS, and channel quality information.

5. The method of claim 3, wherein the load information of the secondary BS includes at least one of a resource use rate of the secondary BS, a number of terminals connected to the secondary BS, or buffer state information of the secondary BS.

6. The method of claim 1, wherein the determining of the secondary BS comprises:
   identifying at least one other BS having a channel state with the terminal, which meets a preset condition, among the at least one other BS based on the second channel state information; and
   determining a BS having a resource use rate smaller than a threshold use rate among the identified at least one other BS as the secondary BS which can share a load of the terminal.

7. The method of claim 1, wherein the determining of the secondary BS comprises:
   identifying at least one other BS having a channel state with the terminal, which meets a preset condition, among the at least one other BS based on the second channel state information; and
   determining a BS having a number of terminals connected thereto, which is smaller than a threshold number, among the identified at least one other BS as the secondary BS which can share a load of the terminal.

8. The method of claim 2, wherein the determining of the resource distribution ratio between the resources of the master BS and the resources of the secondary BS comprises:
   comparing the received signal strength of the secondary BS with a first threshold value and a second threshold value;
   when a received signal strength of the secondary BS is larger than the first threshold value and equal to or smaller than the second threshold value, determining the resource distribution ratio such that the resources of the master BS are used more than the resources of the secondary BS; and
   when the received signal strength of the secondary BS is larger than the first threshold value and the second threshold value, determining the resource distribution ratio such that the resources of the secondary BS are used more than the resources of the master BS.

9. The method of claim 8, wherein, when the received signal strength of the secondary BS is larger than the first threshold value and equal to or smaller than the second threshold value, the determining of the resource distribution ratio such that the resources of the master BS are used more than the resources of the secondary BS comprises:
   comparing a received signal strength of the master BS with a third threshold value; and
   determining the resource distribution ratio such that a resource use rate of the master BS when the received signal strength of the master BS is larger than the third threshold value is larger than a resource use rate of the master BS when the received signal strength of the master BS is equal to or smaller than the third threshold value.

10. The method of claim 2, wherein the determining of the resource distribution ratio between the resources of the master BS and the resources of the secondary BS comprises:
    comparing an amount of data, which the master BS transmits to the terminal, with a fourth threshold value; and
    when the amount of the data, which the master BS transmits to the terminal, is smaller than the fourth threshold value, determining the resource distribution ratio such as only the resources of the master BS are used.

11. An apparatus of a master base station (BS) in a wireless communication system in which BSs having different size cells coexist, the apparatus comprising:
    a transceiver; and
    at least one processor configured to:
    receive, from at least one other BS, load information of the at least one other BS,
    determine a secondary BS among the at least one other BS based on load information of the secondary BS,
    transmit, to a terminal, information requesting for an access of the terminal to the secondary BS,
    receive, from the terminal, first channel state information of a channel between the master BS and the terminal, and second channel state information of a channel between the secondary BS and the terminal after accessing the terminal to the secondary BS, determine a first amount of data and a second amount of data based on the first channel state information and the second channel state information, transmit, to the terminal, the first amount of data, and control the secondary BS to transmit the second amount of data.

12. The apparatus of claim 11, wherein the at least one processor is further configured to:
   determine a resource distribution ratio between resources of the master BS and resources of the secondary BS, and
   process transmission of data to the terminal by using the resources of the master BS and the resources of the secondary BS according to the determined resource distribution ratio.

13. The apparatus of claim 12, wherein the resource distribution ratio is determined based on at least one of the first channel state information, the second channel state information, load information of the secondary BS, and an amount of data to be transmitted to the terminal.

14. The apparatus of claim 13,
   wherein the first channel state information and the second channel state information include at least one of a received signal strength measured based on a cell-specific reference signal (CRS) of the master BS or the secondary BS, and channel quality information.

15. The apparatus of claim 13, wherein the load information of the secondary BS comprises at least one of a resource use rate of the secondary BS, a number of terminals connected to the secondary BS, or buffer state information of the secondary BS.

16. The apparatus of claim 11, wherein the at least one processor is further configured to:
   identify at least one other BS having a channel state with the terminal, which meets a preset condition, among the at least one other BS based on the second channel state information, and
   determine a BS having a resource use rate smaller than a threshold use rate among the identified at least one other BS as the secondary BS which can share a load of the terminal.

17. The apparatus of claim 11, wherein the at least one processor is further configured to:
   identify at least one other BS having a channel state with the terminal, which meets a preset condition, among the at least one other BS based on the second channel state information, and
   determine a BS having a number of terminals connected thereto, which is smaller than a threshold number, among the identified at least one other BS as the secondary BS which can share a load of the terminal.

18. The apparatus of claim 12, wherein the at least one processor is further configured to:
   compare the received signal strength of the secondary BS with a first threshold value and a second threshold value,
   when a received signal strength of the secondary BS is larger than the first threshold value and equal to or smaller than the second threshold value, determine the resource distribution ratio such that the resources of the master BS are used more than the resources of the secondary BS, and
   when the received signal strength of the secondary BS is larger than the first threshold value and the second threshold value, determine the resource distribution ratio such that the resources of the secondary BS are used more than the resources of the master BS.

19. The apparatus of claim 18, wherein the at least one processor is further configured to:
   compare a received signal strength of the master BS with a third threshold value, and
   determine the resource distribution ratio such that a resource use rate of the master BS when the received signal strength of the master BS is larger than the third threshold value is larger than a resource use rate of the master BS when the received signal strength of the master BS is equal to or smaller than the third threshold value.

20. The apparatus of claim 12, wherein the at least one processor is further configured to:
   compare an amount of data, which the master BS transmits to the terminal, with a fourth threshold value, and
   when the amount of the data, which the master BS transmits to the terminal, is smaller than the fourth threshold value, determine the resource distribution ratio such as only the resources of the master BS are used.

* * * * *